Oct. 30, 1934.   S. ZETTERSTROM   1,978,831
SLIDABLE FAUCET VALVE
Filed July 19, 1933
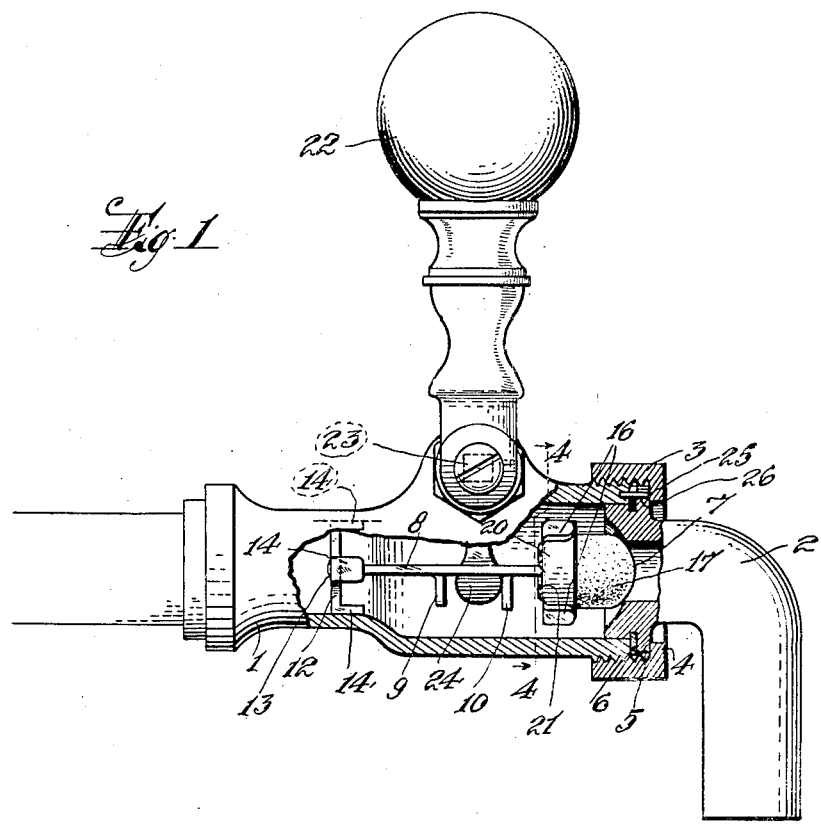
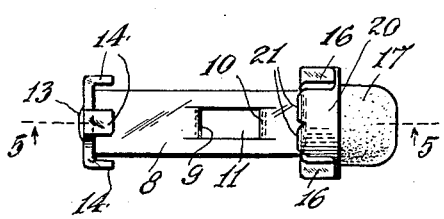
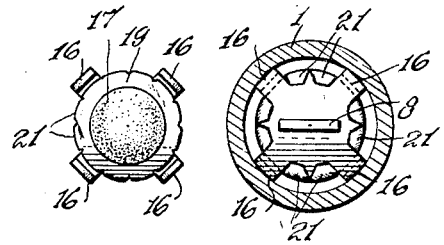
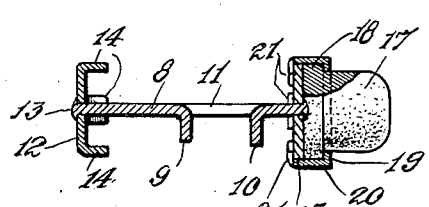
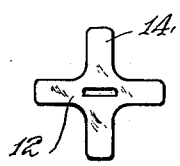
INVENTOR
Sivert Zetterstrom
BY
A. D. T. Libby
ATTORNEY Patented Oct. 30, 1934

1,978,831

UNITED STATES PATENT OFFICE 1,978,831

SLIDABLE FAUCET VALVE

Sivert Zetterstrom, Belleville, N. J.

Application July 19, 1933, Serial No. 681,127

7 Claims. (Cl. 251—133)

This invention relates to a sliding valve used in faucets for dispensing beverages such as soda or beer and has for its object the construction of a valve which will carry the valve seat member absolutely secured in permanent relationship with the other parts of the valve.

Another object of my invention is to provide a sliding valve for the purpose described which is much simpler and easier to make and therefore cheaper to manufacture.

Another object of my invention is to provide a sliding valve which will give perfect alinement with the valve seat.

My invention will be readily understood by reference to the annexed drawing wherein, Figure 1 is a side elevation of a faucet having one side broken away and certain of the parts in section, showing the valve in closed position.

Figure 2 is a top plan view of the valve per se.

Figure 3 is a view of the right-hand end of Figure 2.

Figure 4 is a section on the line 4—4 of Figure 1.

Figure 5 is a view on the line 5—5 of Figure 2, while

Figure 6 is a blank of the rear guide member of the valve, before it is formed into final shape as shown in Figures 2 and 5.

Referring now to the details wherein like numbers refer to corresponding parts in the various views, 1 is the body of the faucet having a nozzle 2 fastened to the body 1 as by a threaded union 3 engaging a collar 5 integral with the nozzle 2. The collar 5 is adapted to engage a suitable gasket 6 which fits against the threaded end of the body 1. The threaded end of the body 1 may be provided with a pin 25 to engage a cooperating depression 26 in the end of the nozzle 2 to position the nozzle so that it will always be in vertical or downward position as indicated in Figure 1. The end of the nozzle 2 adjacent the flange 5 is provided with a valve seat 7 about as indicated in Figure 1.

The valve itself comprises a member 8 of suitable metal, such as brass tin plated or otherwise suitably treated to prevent attack by the liquid passing over it, and having a pair of lugs 9 and 10 punched downwardly as shown in Figures 2 and 5 to form an opening 11. One end of the member 8 is reduced to form a stud over which a rear guide member 12 is placed and held thereto by upsetting or stacking over at 13 the metal of the member 8. The guide member 12 has a plurality, four being shown, of guide fingers 14, preferably symmetrically spaced, as indicated in Figure 6. At the opposite end of the member 8 a member 15 similarly constructed to the member 12, but somewhat larger, is attached to the member 8. However, as will be seen from the various figures, the guide fingers 16 are arcuately spaced intermediate the fingers 14 on the guide member 12. To the member 15 is attached a valve seat engaging member 17, preferably made of rubber vulcanized to a suitable degree of hardness. The valve seat engaging member 17 has a flange 18 engaged by the shoulder 19 of a collar 20, preferably made of a punching which has a plurality of clips 21 bent over the member 15 intermediate the guide fingers 16 thereby securely anchoring the valve seat engaging member 17 in position.

As will be seen from Figure 1 the guide fingers 14 of the member 12 are in engagement and slide on the inner surface of the body 1 of the faucet at the rear of the handle 22 which is pivoted on the faucet in any suitable manner as by a pin 23 which carries an operating arm 24 positioned in the slot 11 of the member 8.

As the lever 22 is operated the arm 24 engages the lugs 9 and 10 to move the sliding member 8 whereby the valve seat engaging member 17 is actuated with respect to the valve seat 7, thereby allowing the liquid to pass through the spaces between the guide fingers 14 and 16 and out through the valve seat into the nozzle 2.

It will be noted that the valve seat 7 is some little distance from the guide fingers 16 which engage the inner wall of the faucet forward of the handle 22 and as the guide fingers 16 and 14 are relatively short longitudinally of the valve the net result is that the valve is self-alining in the faucet and a perfect fit between the seat and the valve seat engaging member 17 is secured. By making the parts of the sliding valve outside of the seat engaging member, of punchings, the same may be made very cheaply while at the same time a much better operating valve is secured, and the valve seat engaging member 17 is permanently and positively anchored to the other parts of the valve member so that it can never become loose or get misplaced.

Certain changes may be made in the details of construction of my improved valve, for example, the rear lug 9 may be turned upward instead of downward as shown in Figure 5. Furthermore, if the stock from which the bar 8 is made is heavier than that shown then one or both lugs may be dispensed with entirely, that is to say, the slot or opening 11 in the bar 8 may be punched out without forming any lugs whatever. It is not so important to have the front lug 10 because the pressure of the liquid against the rear surface of the forward guide member 15 will assist materially in forcing the valve seat engaging member 17 onto its seat 7. Instead of a slot or opening 11, the bar may have notches on the side to receive an arm 24 made with prongs to engage in said notches but such a construction of course is equivalent to that which I have indicated.

Having thus described my invention, what I claim is:

1. A slidable faucet valve including a bar having an opening intermediate its ends, said opening adapted to receive an arm operated by the faucet handle, lugs projecting from one side of the bar at each end of said opening, guide members fastened to the bar, one at each end thereof, spaced guide fingers projecting from the outer parts of said guide members and adapted to engage the inner wall of the faucet in spaced position therein, a clamping collar securely fastened to one of said guide members and a valve seat engaging member held in place by said collar.

2. A slidable faucet valve including a bar having a pair of lugs punched from the bar to form an opening therein, said opening being adapted to receive the end of an operating lever which engages said lugs to move the bar longitudinally of the faucet, guide members fastened to the bar, one at each end thereof, spaced guide fingers projecting from the outer parts of said guide members and adapted to engage the inner wall of the faucet in spaced position therein, a clamping collar securely fastened to one of said guide members and a valve seat engaging member held in place by said collar.

3. A slidable faucet valve including a bar having a pair of lugs punched from the bar to form an opening therein, said opening being adapted to receive the end of an operating lever which engages said lugs to move the bar longitudinally of the faucet, guide members fastened to the bar, one at each end thereof, spaced guide fingers projecting from the outer parts of said guide members and adapted to engage the inner wall of the faucet in spaced positions therein, a clamping collar having clips bent over to engage the guide member between its guide fingers at the valve seat end of the bar and a valve seat engaging member held in place by said collar.

4. A slidable faucet valve as set forth in claim 1 characterized in that the guide member at the seat end is larger in diameter than the other guide member and has its guide fingers arcuately spaced intermediate the guide fingers on the smaller guide member.

5. A slidable faucet valve composed of only punchings and a valve seat engaging member, said punchings comprising a bar; two guide members and a clamping collar; said bar having spaced lugs punched therefrom to form an opening for an operating arm the end of which is adapted to engage said lugs; said two guide members being fastened, one at each end of the bar and each having integral bent over guide fingers to engage the inner wall of the faucet; said clamping collar having an annular shoulder to grip said seat engaging member and clips bent over one of said guide members; said valve seat engaging member having a flange engaged by the shoulder on the collar as described.

6. A slidable faucet valve composed of a flat metal bar having outstanding spaced lugs intermediate its ends adapted to be engaged by the end of an operating arm, metal guide members fastened, one at each end of the bar, each guide member having arcuately spaced bent over guide fingers for the purpose described, a clamping collar having clips to engage one of the guide members and a valve seat engaging member held by said collar to the guide member carrying the collar.

7. A slidable faucet valve composed of a metallic bar having means thereon adapted to be engaged by the end of an operating arm, guide members fastened, one at each end of the bar, each guide member having surfaces to engage the inner wall of said faucet and spaces to let the liquid pass, a clamping collar having clips engaging one of said guide members and a valve seat engaging member held by said collar to the guide member carrying the collar.

SIVERT ZETTERSTROM.